Dec. 31, 1968   O. N. ODDSEN   3,418,704
METHOD OF MAKING A ROLLER BEARING
Original Filed Sept. 2, 1964

INVENTOR.
Odd N. Oddsen
BY Arthur A. March
ATTORNEY

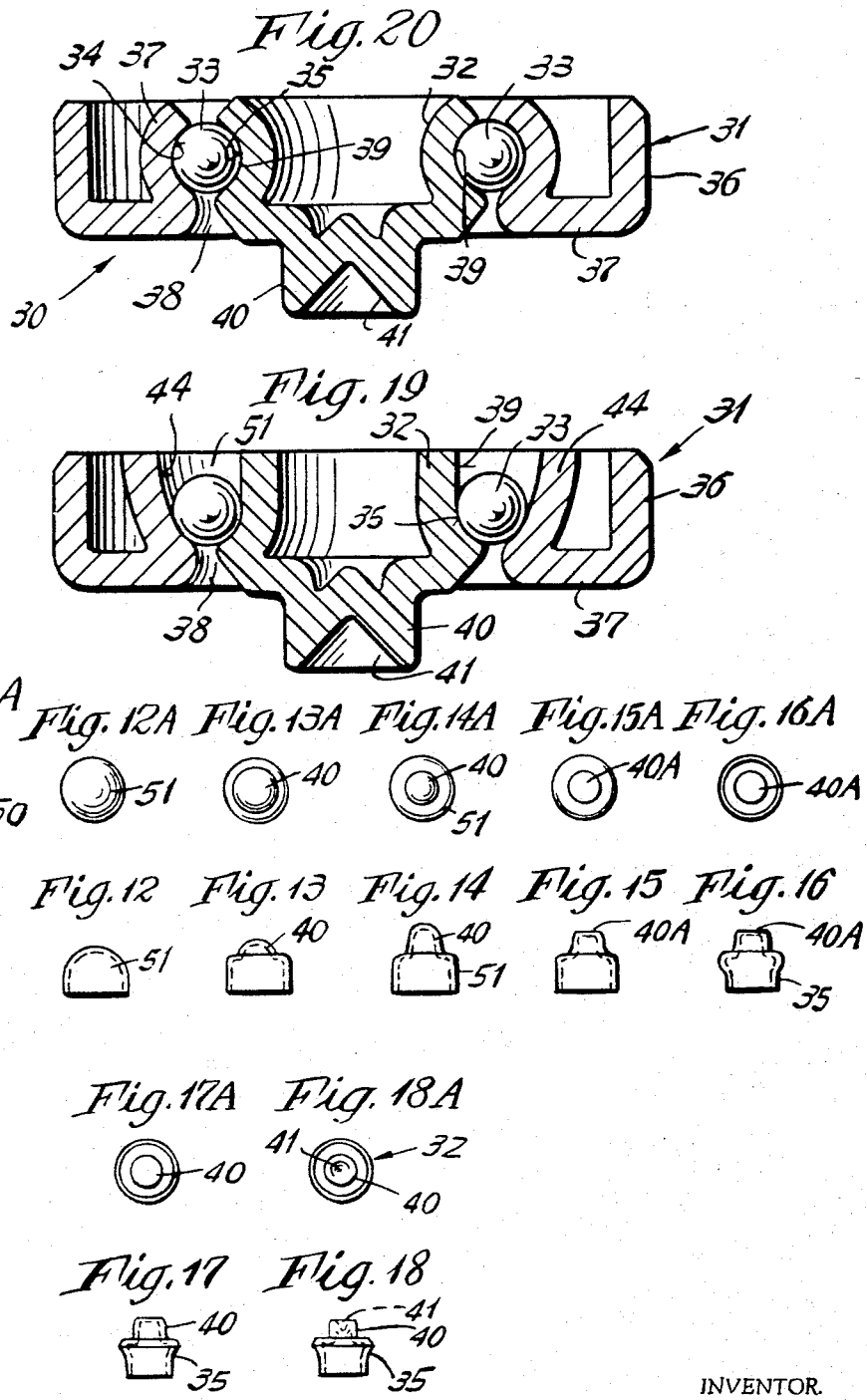

United States Patent Office 3,418,704
Patented Dec. 31, 1968

3,418,704
METHOD OF MAKING A ROLLER BEARING
Odd N. Oddsen, Morristown, N.J., assignor to Hillside Metal Products, Inc., Newark, N.J., a corporation of New York
Original application Sept. 2, 1964, Ser. No. 393,948, now Patent No. 3,317,257, dated May 2, 1967. Divided and this application Apr. 28, 1967, Ser. No. 647,279
6 Claims. (Cl. 29—148.4)

ABSTRACT OF THE DISCLOSURE

This invention is for a method of forming a roller bearing with an inner race member, an outer race member and a plurality of bearings disposed therebetween to effect relative rolling relationship between the members. The method consists of the steps of (1) drawing the outer race member in a series of successive drawing operations from a blank of sheet material into an annular shape having a centrally disposed annular raceway, (2) drawing the inner race member in a series of successive drawing operations from a blank of sheet material into a shape having an annular raceway, (3) positioning said inner race member within an opening formed in said annular outer race member so that the respective raceways thereof are oppositely disposed, (4) placing a plurality of ball bearings between said raceways, (5) and bending the respective raceways of said members to conform to the curvature of the ball bearings and to enclose and retain the ball bearings.

---

This is a divisional application of copending application Ser. No. 393,948 filed Sept. 2, 1964 which has issued as United States Letters Patent 3,317,257 on May 2, 1967.

This invention relates in general to a method of making a roller bearing. More specifically, the invention involves a method of making a roller bearing of the type having a unitary outer race, a unitary inner race and a plurality of ball bearings disposed therebetween.

Heretofore, many attempts have been made to produce a satisfactory roller bearing that may be manufactured in a simple, expedient and economical manner. For example, U.S. Patents 1,976,019 and 2,624,104 disclose attempts in this direction. However, each of the constructions disclosed provides a double wheel to form the outer race. Prior construction required more material, time and labor to fabricate the roller bearing than that needed with the use of the instant invention.

It is an object of this invention to provide an improved method of making a roller bearing construction with the expenditure of a minimum amount of time, labor and material.

Another object is to provide a method of making a roller bearing construction in which various components may be readily fabricated in an expedient and economical manner by stamping or drawing.

Still another object is to provide a method of making a roller bearing construction that is relatively simple in construction and inexpensive to produce while nevertheless being completely efficient and positive an operation.

Figure 1A:
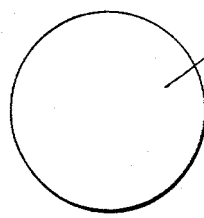
Figure 2A:
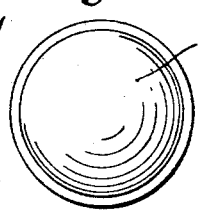
Figure 3A:
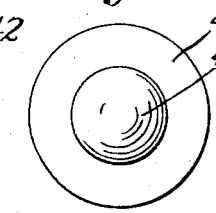
Figure 4A:
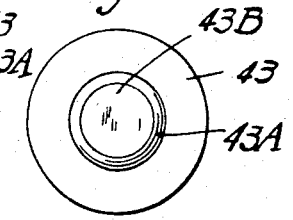
Figure 1:
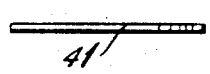
Figure 2:
Figure 3:
Figure 4:
Figure 5A:
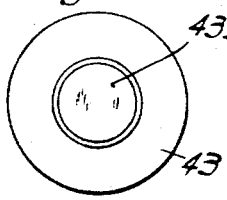
Figure 6A:
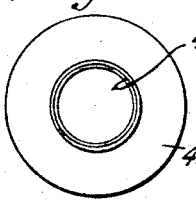
Figure 7A:
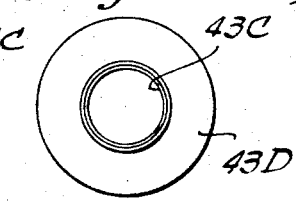
Figure 8A:
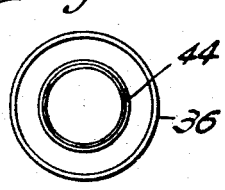
Figure 5:
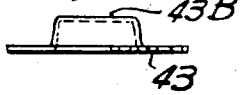
Figure 6:
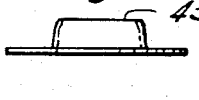
Figure 7:
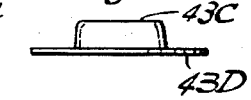
Figure 8:
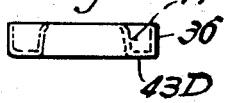
Figure 9A:
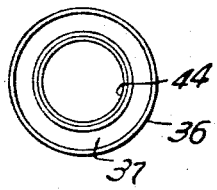
Figure 10A:
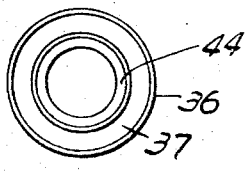
Figure 9:
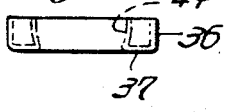
Figure 10:
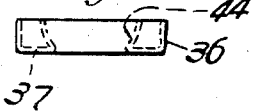

Other features and advantages will become more readily apparent when considered in view of the specification and drawings, in which:

FIG. 1 illustrates an end view of the initial blank from which the outer race member is formed;
FIG. 1A is a plan view of FIG. 1;
FIGS. 2, 3 and 4 illustrate the end views of the successive intermediate forms in which the blank of FIGS. 1 and 1A is drawn or stamped;
FIGS. 2A, 3A and 4A are plan views of FIGS. 2, 3 and 4 respectively;
FIG. 5 illustrates an end view of still another intermediate form;
FIG. 5A is a plan view of FIG. 5;
FIG. 6 illustrates the outer race member after a piercing operation in which a center portion is removed.
FIG. 6A is a plan view of FIG. 6;
FIG. 7 illustrates the shape of the blank after a trimming operation;
FIG. 7A is a plan view of FIG. 7;
FIG. 8 illustrates the blank drawn to its outer diameter;
FIG. 8A is a plan view of FIG. 8;
FIG. 9 shows a partially formed raceway of the outer race.
FIG. 9A is a plan view of FIG. 9;
FIG. 10 illustrates the finished form of the race;
FIG. 10A is a plan view of FIG. 10;
FIG. 11 is an end view of the blank from which the inner race member is formed.
FIG. 11A is a plan view of FIG. 11;
FIGS. 12 to 15 illustrate the successive intermediate drawing forms of the blank of FIG. 11;
FIGS. 12A to 15A are the respective plan views of FIGS. 12 to 15;
FIG. 16 is the partially formed inner race member;
FIG. 16A is a plan view of FIG. 16;
FIG. 17 is the finished raceway;
FIG. 17A is a plan view of FIG. 17;
FIG. 18 illustrates the inner race having the stem thereof finished;
FIG. 18A is the plan view of FIG. 18;
FIG. 19 illustrates a sectional side view of the component parts of the roller bearing in the initial assembled position thereof; and
FIG. 20 illustrates a sectional side view of the roller bearing in its final assembled form.

The roller bearing 30 of the present invention and disclosed in its entirety in FIG. 20. It comprises an outer race member 31, and inner race member 32, and a series of ball bearings 33 interposed between complemental raceway means 34, 35 formed integral with the respective race members 31 and 32.

The outer race 31 is defined by a member having a peripheral flange position 36 to define the rolling surface of the bearing, and an integrally connected annular web portion 37 that defines the side of the roller bearing 30. Integrally formed with the side of the bearing is an inturned portion 37 to define the annular outer raceway 34 which conforms in cross section substantially to a curvilinear portion of the ball bearing 33 retained in rolling engagement therewith.

The inner race 32 is defined by a generally cup-shaped complementary member adapted to be received within the opening 38 defined by the raceway portion 37 of the outer race member 31. The outer wall surface 39 of the cup-shaped, inner race 32, in its final assembled form, is shaped to conform with the inner curvilinear portion of the ball bearings 33. In the illustrated form of the invention, the outer end of the cup shaped, inner race member 32, is provided with an extending stem or boss 40, the end of which is provided with a conical recess 41 converging inwardly as shown in FIGS. 19 and 20.

As assembled, the respective raceway portions 34, 35 of the inner and outer races 31, 32 are each shaped to conform to a curvilinear portion of the ball bearings 33 retained therebetween. The arrangement is such that the complementary raceway portions 34, 35 engage a sufficient portion of the ball bearing 33 circumference to retain the same therebetween. Accordingly, the series of ball bearings 33 maintain their respective race members 31, 32 in relative rotation with respect to one another.

While the roller bearing 30 described can be made by any of several methods, a preferred method is to fabricate the respective race members 31, 32, by a stamping or drawing operation, to a shape which will enhance the final assembly thereof. In accordance with this invention the outer race 31 is formed for a round or disk shaped blank 41 of suitable material, e.g. metal, plastic or the like, as shown in FIGS. 1 and 1A. The blank or disk 41 is next subjected to a series of progressive stamping operations wherein the blank 41 is first formed into a dish or bowl shaped form 42, as evidenced in FIG. 1. As shown, the bowl shaped member 42 is again drawn to define hat shape form 43 (FIGS. 3 and 4) in which the crown portion 43A thereof is flattened to simulate a flattened dome. The blank thus formed is next subjected to a forming operation in which curvilinear annular wall portion of the dome is transformed to a substantially cylindrical shape. (See FIG. 5 and 5A.) The next operation comprises piercing or cutting away the top 43B of the crown so that an opening 43C is provided, the latter being circumscribed by the substantially cylindrical wall (FIGS. 6, 6A). Next, if necessary, the flange or brim portion 43D of the member is trimmed to the desired outside diameter (FIGS. 7 and 7A). With the flange 43D properly trimmed, the shape of FIGS. 7 and 7A is then drawn to O.D. In drawing the O.D., as best seen in FIGS. 8 and 8A, the outer annular portion of the flange or brim 43D is latently bent to define the rolling periphery 36 of the outer race 31.

With the race member 31, thus partially formed, the substantial cylindrical surface 44 is expanded outwardly as shown in FIGS. 9 and 9A. The race member is then finished by forming the expanded surface 44 so that the opposed diametrical portions therefor, in cross section, define curvilinear portions conforming to an arc.

The iner race 32 is likewise formed from a disk shaped blank 50, as best shown in FIGS. 11 and 11A. The disk 50 is drawn in a series of successive drawing operations—into a cup shaped member 51 having an outwardly extending protuberance to define a stem 40 formed in the bottom thereof. The successive drawing steps and the forms resulting therefrom are shown in FIGS. 12 to 15 and 12A to 15A respectively. In the final drawing operation, as seen in FIGS. 15 and 15A, the stem 40 in the bottom wall has been flattened at its outer end 40A.

The cylindrical wall portion of the cup shaped inner race member is then operated upon to partially define the inner raceway 39. This is accomplished by expanding inwardly the walls of the cup shaped portion to reduce the open end of the member. Preferably this inwardly expanding of the cup may be done in two successive steps, as evidenced by FIGS. 16 and 17. With the inner race 32 thus formed, the final operation to complete the forming of the same is that of forming the indentation or recess 41 in the outer end of the stem 40.

Thus with the outer race member 31 formed to the stage shown in FIGS. 10, 10A, and with the inner race member 32 finished to the stage as shown in FIGS. 18, 18A, the respective components are readied for final assembly.

Referring to FIG. 19, the assembly of the outer race 31, inner race 32 and the ball bearings 33 is attained by placing the inner race member 32, as shown, within the opening 38 of the outer race 31 so that the respective raceways forming portions 39, 35 thereof are coaxially disposed. Accordingly, the outwardly expanded raceway 4 of the outer member, and the inwardly expanded raceway 35 of the inner member define an annular opening 51 (FIG. 20) sufficiently larger to receive the ball bearings 33. However, the spacing between the lower ends of the respective members 31, 32 prohibit the balls 33 from dropping therethrough. Further, the respective lower end portions of the respective raceway members 34, 35 are formed to conform nearly to the opposed curvilinear portions of the balls 33. With the parts assembled, as shown in FIG. 19, the final operation is that of forming the respective upper ends of the inwardly and outwardly expanded raceways 34, 35 so that they conform to the circumference of the balls 33, as shown in FIG. 20. Thus in the final assembly, the balls 33 are positively retained in the race defined by 34 and 35.

From the foregoing, it will be apparent that the respective race members 31, 32 are simply formed by drawing the same from a preformed blank, in which a minimum of material is required to form the same. Further, the respective race members 31, 32 are formed so that they can be readily assembled in a minimum of time and with a minimum of effort.

While the invention has been described in illustrative detail, it will be understood that variations and modifications may be made without departing from the spirit of the invention or the scope of the appended claims.

I claim:

1. A method of forming a roller bearing comprising an inner race member, an outer race member, and a plurality of bearings interposed therebetween to effect relative rolling relationship between said members comprising the steps of
    (a) drawing the outer race member in a series of successive drawing operations from a blank of sheet material into an annular shape having a centrally disposed annular raceway,
    (b) drawing the inner race member in a series of successive drawing operations from a blank of sheet material into a shape having an annular raceway,
    (c) positioning said inner race member within an opening formed in said annular outer race member so that the respective raceways thereof are oppositely disposed,
    (d) placing a plurality of ball bearings between said raceways,
    (e) and bending the respective raceways of said members to conform to the curvature of said ball bearings and to enclose and retain said ball bearings.

2. A method of forming a roller bearing comprising an inner and outer race member, and a plurality of bearings interposed therebetween to effect relative rolling relationship between said members comprising the steps of
    (a) drawing the outer race member in a series of successive drawing operations from a blank of sheet material into an annular shape having an outer flange defining the rolling periphery of said bearing and a centrally disposed annular raceway having a bearing surface area inclining outwardly toward said flanged periphery,
    (b) drawing the inner race member in a series of successive drawing operations from a blank of sheet material into a cup shaped form in which the wall of the cup shaped form is expanded inwardly to define a complementary raceway,
    (c) positioning said inner race member within the opening of said annular outer race member so that the respective raceways thereof are oppositely disposed,
    (d) placing a plurality of ball bearings between said raceways,
    (e) and bending the respective raceways of said members to conform to the curvature of said ball bearings and to enclose and retain said ball bearings.

3. The method of forming a roller bearing comprising of an inner race, an outer race, and a series of ball bearings confined between said inner and outer race comprising the steps of
    (a) drawing the outer race from a blank of stock material in a series of forming operations to define a member having an annular laterally extending flange portion formed with a central recessed portion,
    (b) removing the bottom of said recessed portion,
    (c) drawing said member to define peripheral flange about said recessed portion,
    (d) forming the walls of said recessed portion to define the outer raceway for said bearings, (e) drawing the inner race from a blank of stock material in a series of drawing operations to define a member having a cup shape,
(f) expanding the walls of said cup shaped member inwardly to form an inner raceway for engaging said ball bearings
(g) disposing the inner race within the opening of the outer race,
(h) disposing a series of balls between the opposing raceways defined by the respective members,
(i) and bending the respective raceways of said members to conform to the curvature of said ball bearings and to enclose and retain said ball bearings.

4. The invention, as defined in claim 3, and including the step of forming a stem projecting outwardly from the bottom of said cup shaped inner race member.

5. A method of making a roller bearing of the type including an outer unitary race, an inner unitary race member, and a series of balls interposed therebetween comprising the steps of
(a) forming the outer race from a sheet of blank material by stamping into a member having an annular flange circumscribing a recessed portion,
(b) removing the bottom of said recessed portion,
(c) expanding the walls of said recessed portion outwardly to an enlarged diameter about the removed bottom end thereof,
(d) forming the inner race from a sheet of blank material by stamping into a cup shaped member having a projecting stem portion formed in the bottom thereof,
(e) expanding inwardly the walls of said cup shaped member to reduce the diameter about the open end thereof,
(f) locating said cup shaped member concentrically with respect to said enlarged recessed portion of said outer race member,
(g) placing a plurality of balls between the walls of said recessed portion and said cup shaped member,
(h) and bending the respective walls of said members to conform to the curvature of said ball bearings and to enclose and retain said ball bearings.

6. A method of making a roller bearing of the type including an outer unitary race, an inner unitary race member, and a series of balls interposed therebetween comprising the steps of
(a) forming the outer race of a sheet of blank material by stamping into a member having an annular lateral extending flange circumscribing a centrally disposed recessed portion,
(b) removing the bottom of said recessed portion,
(c) forming said flange portion to define a rolling periphery,
(d) expanding the walls of said recessed portion outwardly about the opened bottom, to an enlarged diameter thereof,
(e) forming the inner race from a sheet of blank material by stamping into a cup shaped member.
(f) expanding the walls of said cup shaped member to reduce the diameter of the open end of said second cup shaped member,
(g) locating said cup shaped member within the opened bottom recessed portion so that the inwardly expanded wall portion thereof is opposed to the expanded wall portion of said recessed portion to define a raceway for receiving and retaining the balls therebetween,
(h) placing a plurality of balls between the walls of said members,
(i) and bending the respective walls of said members to conform to the curvature of said ball bearings and to enclose and retain said ball bearings.

References Cited

UNITED STATES PATENTS

| 1,387,638 | 8/1921 | Bingham | 29—148.4 |
| 1,976,019 | 10/1934 | Heim | 29—148.4 |
| 2,112,754 | 3/1938 | Annen | 29—148.4 |
| 2,624,104 | 1/1953 | Finstead | 29—148.4 |
| 2,998,636 | 9/1961 | Spence et al. | 29—148.4 |
| 3,137,920 | 6/1964 | Bushi | 29—148.4 |
| 3,317,257 | 5/1967 | Oddgen | 308—191 |

THOMAS H. EAGER, *Primary Examiner.*

U.S. Cl. X.R.

29—434, 442; 308—191